Sept. 14, 1943.   A. L. WEAVER   2,329,429
CHEMICAL CARRIER FOR WATER TREATMENT
Filed March 14, 1941
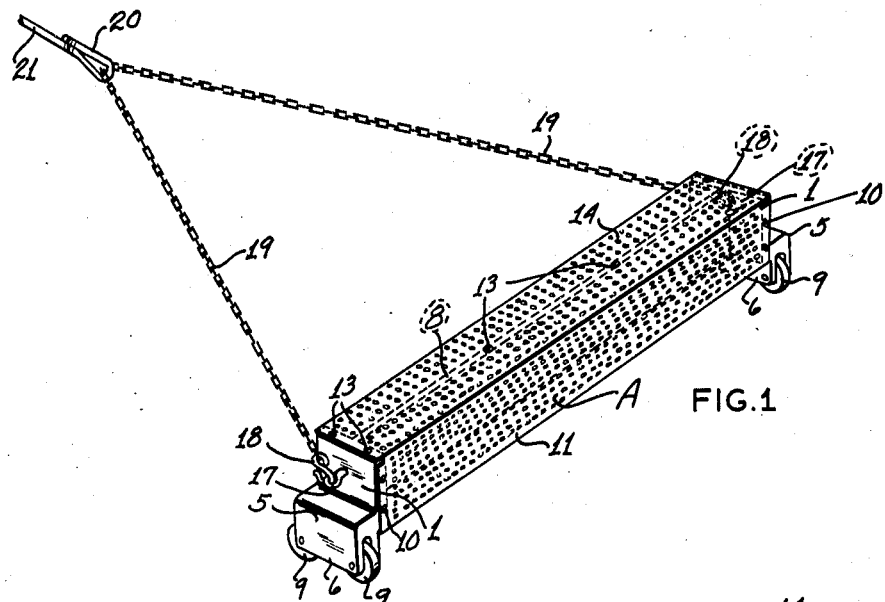
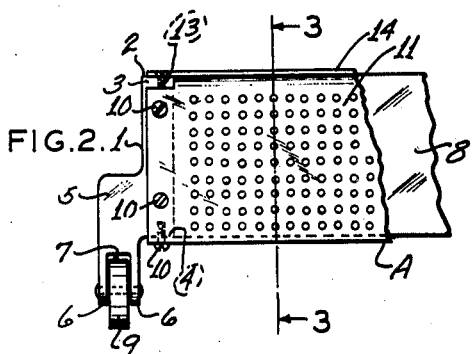
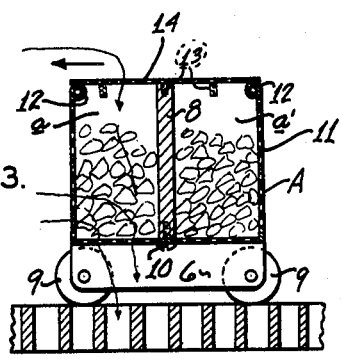
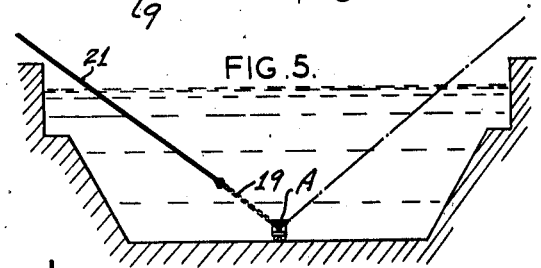
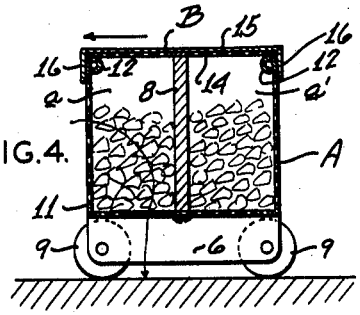
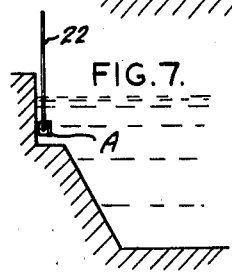
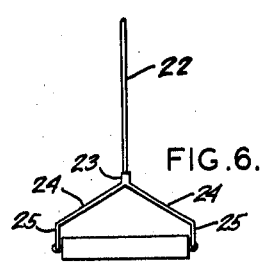
INVENTOR.
ASHLEY L. WEAVER
BY
ATTORNEY Patented Sept. 14, 1943

2,329,429

UNITED STATES PATENT OFFICE 2,329,429

CHEMICAL CARRIER FOR WATER TREATMENT

Ashley L. Weaver, Maplewood, Mo.

Application March 14, 1941, Serial No. 383,261

2 Claims. (Cl. 210—29)

This invention relates generally to the chemical treatment of swimming pools and the like and, more particularly, to a certain new and useful improvement in means for subjecting the pool-water to chemical treatment for the destruction of fungus growths and the like.

Public swimming-pools and the like require, as is commonly known, substantially constant vigilance for their sanitary maintenance. And one of the frequent causes of an unsanitary condition in a pool necessitating complete removal for sanitary maintenance is a fungus growth known as algae.

My present invention has hence for its chief object the provision of means in the form of a perforated chemical container uniquely constructed for convenient travel in the pool for effecting destruction of fungus growths of the type mentioned and other impurities.

My invention has for further objects the provision, as a new article of manufacture, of a rugged, durable, compact chemical carrier suitable for immersion in and movement through the pool-water and the like for germicidal treatment, which is unaffected by either the chemical members or the pool-water itself, which is simple and inexpensive in construction and may be very readily and easily usable with a minimum of labor, which is uniquely arranged for forcibly circulating pool-water through the mass of chemicals during movement or travel through the pool-water for effectively and positively introducing thereinto a quantity of the treating chemical sufficient to produce a satisfactory destructive effect, and which is highly efficient in the performance of its stated functions.

And with the above and other objects in view, my invention resides in the novel features of form, construction, arrangement, and combination of parts presently described and pointed out in the claims.

In the accompanying drawing:

Figure 1 is a perspective view of a re-agent carrier constructed in accordance with and embodying my present invention;

Figure 2 is an enlarged fragmentary front elevational view of the carrier;

Figure 3 is a transverse sectional view of the carrier taken approximately along the line 3—3, Figure 2;

Figure 4 is a similar view of the carrier with its closure-lid in place;

Figure 5 is a reduced diagrammatic view illustrating the disposition and travel-movement of the carrier for the purifying or germiciding treatment of a swimming pool; and Figures 6 and 7 are reduced top plan and diagrammatic views, respectively, of the carrier equipped with a modified form of handle-structure for facilitating treatment of the water adjacent the vertical side walls of the pool.

Referring now in more detail and by reference characters to the drawing, which illustrates a preferred embodiment of my invention, the carrier, generally designated A, is in the form of a carriage comprising a pair of suitably rigid parallel end walls 1 preferably of rectangular contour and having relatively wide top, side, and bottom marginal faces 2, 3, 4, respectively. Upon their outer face, each of the end walls 1 is preferably integrally provided with an outwardly projecting depending boss or enlargement 5 recessed in its under face in the provision of spaced flanges 6 providing an open-ended inverted-U-shaped channel or way 7. Formed preferably integrally with, and extending between, the opposed inner faces of the end walls 1, is a vertically disposed cross wall 8 preferably unitarily connecting the end wall members 1 in suitable spaced relation, the wall 8 being preferably disposed midway between the marginal side faces 3 and having a vertical dimension substantially equal to the vertical dimension of the end walls 1. Suitably journaled for rotation and preferably disposed in tandem relation in each of the ways 7, are respective pairs of suitably spaced rollers 9, all as best seen in Figures 1, 2, and 3 and for purposes presently fully appearing.

The so-connected end walls 1 and their supporting rollers 9 provide a rollable frame, and suitably fixed at its opposed transverse margins, as by means of screws 10 or the like, upon the side and bottom faces 3, 4, of, and extending horizontally between, the end walls 1, is a U-shaped trough-like member 11 formed preferably of any suitable foraminous or reticulated sheet metallic material providing a multitude of openings or perforations. At is upper horizontally extending margins, the perforated or apertured wall-member 11 is provided with curled-over beads 12, the upper peripheral portions of which lie substantially in the plane of the end wall top faces 2.

Detachably secured, as by means of countersunk flat-headed screws 13 or the like, upon, and extending horizontally between, the end wall faces 2, is a like flat foraminous or reticulated cover plate 14 having a length slightly less than the distance between the outer faces of the end wall members 1 and a width substantially equal to the distance between the outer faces of the vertically disposed sections or legs of the U-shaped wall-member 11 for abutment upon its under face with the beads 12 in the formation of two basket-like compartments a, a', separated by the preferably solid imperforate vertically disposed connecting wall-member 8, all as best seen in Figure 3 and for purposes presently fully appearing.

Adapted for snugly fitting removably upon and over the top wall or plate 14, is an imperforate closure lid B stamped or otherwise suitably formed of sheet metal and including a top panel 15 provided with a narrow depending marginal flange 16, all as best seen in Figure 4.

Thus the carrier includes a pair of containers each having perforated front, top, and bottom walls and imperforate end and rear walls, the wall 8 being common to both containers.

Fixed in, and projecting from, the outer face of each of the end walls 1, are eyes 17, detachably engaged with which are suitable hooks 18 conventionally fixed upon the opposite ends of a suitable length of pull chain 19, in turn, conventionally looped through the end-eye 20 of a conventional draw rope 21.

In substitution of the hooks 18 and the chain 19, is a suitably elongated shaft 22 provided at its one end with a yoke 23 having outwardly diverging arms 24, in turn, provided at their ends with forwardly projecting parallel sections 25 bent over at their ends for engagement in the eyes 17, all as best seen in Figure 6.

It should be noted that all of the several parts of the carrier or carriage A should be fabricated from bronze, stainless steel, or other chemical-resistant materials so as to be substantially unaffected by the chemical or agents employed in the pool-treatment. For like reason, the chain 19 and yoke 23 should also be constructed of chemical-resistant materials. Since, however, both the chain 19 and yoke 23 are generally of sufficient size, the drag rope 21 and the handle 22 are sufficiently removed from the region of the agent carrier itself, so that the concentration of the carried chemical is sufficiently dilute as to be ineffective.

In use, the lid B and top plate 15 are initially removed from the carrier A and the two compartments a, a', filled with crystalline copper sulphate or other suitable bactericidal agent. The top plate 14 and lid B are thereupon replaced, and the carrier A suitably disposed in, and pulled by means of the rope 21 and chain 19 along the bottom of, the pool, as shown in Figure 5. As the carrier A is drawn in one direction, the water of the pool will flow into the chamber a and be deflected by the wall 8 downwardly, causing the water forcibly to circulate through the quantity of copper sulphate or other treating material, as shown by the arrow in Figure 4. At the same time, the forward movement of the carrier A and particularly the wall 8 thereof produces a condition in the nature of a vacuum in the chamber a', which induces an upward and rearward circulatory flow of the pool-water, thereby promoting intimate chemical-agent treating contact with the water and materially facilitating the inter- mixing and solution therein of a suitable quantity of the chemical-agent material.

In the region of the sump of the pool, there is an increased tendency to algae growth and concentration of bacteria, making it desirable that increased amounts of the treating agent be introduced into the water in this region. To effect this purpose, the lid B may be removed and the carrier A pulled back and forth across the grating over the sump. In such case, the water flows not only downwardly through the compartments a, a', but also upwardly, as indicated by the arrows in Figure 3.

In order to inhibit algae growth along the side walls of the swimming pool, the chain 19 is preferably detached from the eyes 17 and the handle 22 substituted, so that the carrier A, with its rollers or wheels 9 presented against the side faces of the pool, as shown in Figure 7, may be rolled up and down with a vertical motion for effectively treating the water in this region.

The carrier A has been found exceedingly efficient in the performance of its intended functions, and it should be understood that changes and modifications in the form, construction, arrangement, and combination of the several parts of the structure may be made and substituted for those herein shown and described without departing from the nature and principle of my invention.

Having thus described my invention, what I claim and desire to secure by Letters Patent is:

1. A re-agent carriage including a frame comprising spaced end walls rigidly joined in spaced parallel relation by an imperforate cross wall, said end walls having offset depending members, rollers mounted in said members for rollable movement of the carriage, a U-shaped trough-like member of foraminous material mounted upon the side and bottom marginal faces of, and extending horizontally between, the end walls and co-operable with said cross wall in the formation of a pair of containers each for presenting a contained re-agent to the water being treated, said cross wall being common to the containers substantially as and for the purposes described.

2. A re-agent carriage adapted for to-and-fro movement over and upon the walls of a swimming pool and including a rollable frame comprising spaced end walls rigidly joined in spaced parallel relation by an imperforate cross wall disposed midway between the marginal side faces, and having a vertical dimension substantially equal to the vertical dimension of said end walls, a U-shaped trough-like member of foraminous material mounted upon the side and bottom marginal faces of, and extending between, the end walls, and a foraminous top wall detachably secured to said cross wall and extending horizontally between said end walls, said trough-like member and said top wall being co-operable with said cross wall and with each other in the formation of two oppositely facing basket-like compartments each for presenting a contained re-agent to the water being treated and said cross wall being common to said compartments substantially as and for the purposes described.

ASHLEY L. WEAVER.